(12) United States Patent
Magableh

(10) Patent No.: US 12,099,795 B2
(45) Date of Patent: *Sep. 24, 2024

(54) MOBILE DEVICE AND METHOD

(71) Applicant: HUAWEI TECHNOLOGIES CO., LTD., Guangdong (CN)

(72) Inventor: Basel Magableh, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,426

(22) Filed: May 19, 2023

(65) Prior Publication Data

US 2023/0289511 A1 Sep. 14, 2023

Related U.S. Application Data

(63) Continuation of application No. 17/480,828, filed on Sep. 21, 2021, now Pat. No. 11,694,019, which is a
(Continued)

(30) Foreign Application Priority Data

Nov. 27, 2015 (EP) .................................. 15196779

(51) Int. Cl.
*G06F 40/106* (2020.01)
*G06F 40/134* (2020.01)
(Continued)

(52) U.S. Cl.
CPC .......... *G06F 40/106* (2020.01); *G06F 40/134* (2020.01); *G06Q 10/10* (2013.01); *H04W 4/12* (2013.01)

(58) Field of Classification Search
CPC ...... H04W 4/12; G06F 40/106; G06F 40/134; G06Q 10/10
See application file for complete search history.

(56) References Cited

U.S. PATENT DOCUMENTS 11,151,302 B2 * 10/2021 Magableh ............. G06F 40/134
11,694,019 B2 * 7/2023 Magableh ............. G06F 40/134
715/208
(Continued)

FOREIGN PATENT DOCUMENTS

CN 104618227 A 5/2015
CN 104820540 A 8/2015
(Continued)

OTHER PUBLICATIONS

Extended European Search Report dated Apr. 12, 2016 in corresponding European Patent Application No. 15196779.1, 7 pages.
(Continued)

*Primary Examiner* — Kyle R Stork
(74) *Attorney, Agent, or Firm* — Fish & Richardson P.C.

(57) ABSTRACT

A computer device comprises a display and at least one processor. The at least one processor is configured to: intercept information to be displayed on the display; identify an information entity in the intercepted information; reformat appearance of the identified information entity to be displayed on the display; display the intercepted information including the reformatted appearance of the identified information entity on the display, map the identified information entity with a mapped application, create a shortcut link between the identified information entity and the mapped application, and display the shortcut link.

9 Claims, 11 Drawing Sheets

Related U.S. Application Data continuation of application No. 15/943,144, filed on Apr. 2, 2018, now Pat. No. 11,151,302, which is a continuation of application No. PCT/CN2016/104742, filed on Nov. 4, 2016.

(51) Int. Cl.
*G06Q 10/10* (2023.01)
*H04W 4/12* (2009.01)

(56) References Cited

U.S. PATENT DOCUMENTS

| | | |
|---|---|---|
| 2006/0069687 A1 | 3/2006 | Cui et al. |
| 2012/0159388 A1* | 6/2012 | Chalouhi .............. G06F 16/435 715/810 |
| 2014/0337590 A1 | 11/2014 | Lemus et al. |
| 2014/0354680 A1* | 12/2014 | Eriksson ................. G06T 11/60 345/619 |
| 2016/0014561 A1 | 1/2016 | Inzer et al. |
| 2017/0147202 A1* | 5/2017 | Donohue ............ G06F 3/04886 |

FOREIGN PATENT DOCUMENTS

| | | |
|---|---|---|
| EP | 1372095 A1 | 12/2003 |
| WO | 2012115981 A1 | 8/2021 |

OTHER PUBLICATIONS

International Search Report dated Jan. 24, 2017 in corresponding International Patent Application No. PCT/CN2016/104742, 4 pages.
Written Opinion of the International Searching Authority dated Jan. 24, 2017 in corresponding International Patent Application No. PCT/CN2016/104742, 5 pages.

* cited by examiner

MOBILE DEVICE AND METHOD

CROSS-REFERENCE TO RELATED APPLICATIONS

This application is a continuation of U.S. patent application Ser. No. 17/480,828, filed on Sep. 21, 2021, which is a continuation of U.S. patent application Ser. No. 15/943,144, filed on Apr. 2, 2018, now U.S. Pat. No. 11,151,302, which is a continuation of International Application No. PCT/CN2016/104742, filed on Nov. 4, 2016, which claims priority to European Patent Application No. EP15196779.1, filed on Nov. 27, 2015. All of the afore-mentioned patent applications are hereby incorporated by reference in their entireties.

TECHNICAL FIELD

Implementations described herein generally relate to a mobile device and a method therein. In particular is herein described a mechanism for enhancing user experience, based on user generated data from an application running in the mobile device.

BACKGROUND

Activity-awareness in mobile computing has inspired novel approaches for creating smart personalized services/functionalities in mobile devices. The ultimate goal of such approaches is to enrich the user's experience and enhance software functionality.

One of the major challenges in integrating mobile operating systems with activity aware computing, is the difficulty of capturing and analyzing users generated content from their personal handsets/mobile devices, without outweigh their privacy and securing the collected sensitive data.

Although conventional solutions exist for collecting and extracting textual contents generated by users in social computing applications, these solutions are most unsatisfying when it comes to personal integrity of the user. All previously known conventional solutions comprises collecting the user's generated content from various applications such as e.g. an email client and/or Short Message Service (SMS) applications; and more in general collect statistics about the mobile device usage, related e.g. to visited web pages, communicated parts, etc.

Such approach could provide a user with e.g. a reminder about their flight, nearby places that match their preferences and may also enhance a search query performed by the user using his/her handset in a proactive manner. But unfortunately, all of those applications are introduced to the user after exposing and sharing his/her personal data to a web services located outside the mobile device, e.g. in the cloud. In addition, the collected information is stored outside the user's personal mobile device in some remote server.

To extract personal/private information from a user's mobile device and send it over a network to a central server for analysis and storage is discouraging to many users, who are concerned with their privacy. Further, extracted personal/private information may be exploited by a malicious third party (e.g. a burglar may detect that a certain user will be on travel during a period, and use this information for timing his break-in; or business critical information may leak to a competitor).

These serious drawbacks make many users reluctant to use the described conventional solutions. However, there is still a request for personalized pro-active services functionalities.

SUMMARY

It is therefore an object to obviate at least some of the above mentioned disadvantages and to enhance user experience, based on user generated data from an application running in a mobile device. This and other objects are achieved by the features of the appended independent claims. Further implementation forms are apparent from the dependent claims, the description and the figures.

According to a first aspect, a mobile device is provided. The mobile device comprises a display and a processor. The processor is configured to intercept information sent from an application, to be displayed on the display of the mobile device. Further the processor is also configured to identify an information entity in the intercepted information, comprised in a predefined set of information entity types. Also, the processor is further configured to reformat appearance of the identified information entity to be displayed on the display. In addition, the processor is further configured to forward the intercepted information including the reformatted appearance of the identified information entity to be displayed on the display. The display is configured to present the identified information entity with the reformatted appearance to the user of the mobile device.

Thanks to the described aspect, information, such as display commands sent from a third part arty application to a display application comprising text, graphics, format, position, etc., which belongs to a predefined information entity type may be detected by the processor. The predefined information entity type may e.g. be related to time and place for a meeting, as inputted in a communication exchange in the third party program by a user of the mobile device or his/her communication counterpart. Such detected information may be reformatted before presentation on the display, e.g. by high lighting certain information, providing an internet shortcut or insert meeting data into a calendar program of the mobile device, etc. Thus user experience is enhanced.

By performing the method locally in the mobile device, privacy of the user is not breached. Neither the structure of the text is breached by the provided solution.

In a first possible implementation of the mobile device according to the first aspect, wherein the application is an instant messaging application and the intercepted information comprises an instant message, the processor is configured to determine a display location of the instant message on the display, based on the intercepted information. Further the processor is additionally configured to determine a source of origin of the instant message based on the determined display location. The processor is also configured to reformat the appearance of the identified information entity based on the determined source of origin.

Thereby, by determining the display location of intercepted information, the source of origin of the information, i.e. the user of the mobile device, or the communication counterpart of the user, may be determined. By reformatting the information based on the source of origin, user experience may be further enhanced.

In a second possible implementation of the mobile device according to the first aspect, or the first possible implementation of the mobile device according to the first aspect, the processor is further configured to map the identified information entity with a further application, based on the information entity type of the identified information. The processor is also configured to create a shortcut link between the identified information entity and the mapped application. Further the display of the mobile device is configured to display the shortcut link.

Thereby, further implementation is specified, enhancing user experience and simplifying mobile usage of the user.

In a third possible implementation of the mobile device according to the first aspect, or any of the earlier described possible implementations thereof, the intercepted information is a control message sent from the application and addressed to a display application. The control message comprising at least the information entity to be displayed on the display and indicating an appearance for displaying the information entity on the display and preferably a location for displaying the information entity on the display. The processor is configured to forward the intercepted information including the reformatted appearance of the identified information entity to the display application.

By intercepting control commands sent from a ($3^{rd}$) party application to a display application (configured to control the display of the mobile device), the reformatting of the information entity can be performed without having access to the $3^{rd}$ party application or without altering a source code of the $3^{rd}$ party application. Hence, for the $3^{rd}$ party application the complete process of reformatting is invisible. Therefore it is enabled that, independent of the type and capabilities of the $3^{rd}$ party application user experience can be enhanced by adding the functionalities as described in the present disclosure.

In a fourth possible implementation of the mobile device according to the first aspect, or any of the earlier described possible implementations thereof, the processor is further configured to identify information entity types comprising any of: person name, location, time, date, address, URL, phone number and/or email address presented as text, audio or image.

Thereby, the information entity types are further specified. By detecting and extracting these information entity types from a conversation on the mobile device (entered by the user or by the other part), an appointment concerning e.g. a flight, business meeting or doctor appointment may be detected and stored in a calendar application and a reminder may be set to remind the user of the appointment. Thus user experience is increased and mobile device usage is simplified.

In a fifth possible implementation of the mobile device according to the first aspect, or any of the earlier described possible implementations thereof, the processor is further configured to denote an event in the user's calendar application at the identified time/date according to the information entity, when an information entity is identified as a time related information entity type.

By recognizing information calendar related information, e.g. in a chat text or message exchange, such recognized information may be inserted in the user's calendar program. Thereby the user is relieved from manual entrance of meeting data into the calendar program, which is time saving and convenient for the user. Also, the risk of mistyping data into the calendar program is reduced, or even omitted. Thereby the risk of missing a meeting, appointment or scheduled event is reduced.

In a sixth possible implementation of the mobile device according to the first aspect, or any of the earlier described possible implementations thereof, the processor is further configured to map the identified information entity and the application based on the information entity type, by mapping: a person name to a phone book application; a location to a map application; a time/date to a calendar application; an address to a map application; an URL to a web browser application; a phone number to an SMS application; and/or an email address to an emailing application.

Thereby, further implementation is specified, enhancing user experience and simplifying mobile usage of the user.

In a seventh possible implementation of the mobile device according to the first aspect, or any of the earlier described possible implementations thereof, the processor is further configured to reformat appearance of the identified information entity in the application by rich text formatting when the information entity comprises text.

Thereby essential information in a text message may be immediately recognized and read by the user, thereby further enhancing user experience.

In an eighth possible implementation of the mobile device according to the first aspect, or any of the earlier described possible implementations thereof, the processor is further configured to set a reminder, reminding the user of an event denoted in the user's calendar application.

Thereby, the user may be notified about the detected event, assisting the user in avoiding missing the detected event.

In a ninth possible implementation of the mobile device according to the first aspect, or any of the earlier described possible implementations thereof, the processor is further configured to add a clickable event, linking to a calendar application, showing detailed information about the meeting.

Thus the user could easily find the event in the calendar application and e.g. check that the inserted data is correct and wherein the user may enter additional information into the calendar application.

According to a second aspect, a method performed locally in a mobile device is provided. The method comprises intercepting information sent from an application, to be displayed on a display of the mobile device. Further the method comprises identifying an information entity in the intercepted information, comprised in a predefined set of information entity types. In addition, the method also comprises reformatting appearance of the identified information entity to be displayed on the display. The method also comprises forwarding the intercepted information including the reformatted appearance of the identified information entity to be displayed on the display. Additionally, the method further comprises presenting the identified information entity with the reformatted appearance to the user of the mobile device.

Thanks to the described aspect, information, such as display commands comprising text, graphics, format, position, etc., which belongs to a predefined information entity type may be detected from a third party program. The predefined information entity type may e.g. be related to time and place for a meeting, as inputted in a communication exchange in the third party program by a user of the mobile device or his/her communication counterpart. Such detected information may be reformatted before presentation on the display, e.g. by high lighting certain information, providing an internet shortcut or insert meeting data into a calendar program of the mobile device, etc. Thus user experience is enhanced.

By performing the method locally in the mobile device, privacy of the user is not breached. Neither the structure of the text is breached by the provided solution.

In a first possible implementation of the method according to the second aspect, wherein the application is an instant messaging application and the intercepted information comprises an instant message, the method further comprises determining a display location of the instant message on the display, based on the intercepted information. Further the method comprises determining a source of origin of the instant message based on the determined display location. Additionally, the method also comprises reformatting the appearance of the identified information entity based on the determined source of origin.

Thereby, by determining the display location of intercepted information, the source of origin of the information, i.e. the user of the mobile device, or the communication counterpart of the user, may be determined. By reformatting the information based on the source of origin, user experience may be further enhanced.

In a second possible implementation of the method according to the second aspect, or the first possible implementation of the second aspect, the method also comprises mapping the identified information entity with a further application, based on the information entity type of the identified information. The method furthermore comprises creating a shortcut link between the identified information entity and the mapped application.

Thereby, further implementation is specified, enhancing user experience and simplifying mobile usage of the user.

In a third possible implementation of the method according to the second aspect, or any of the earlier described possible implementations thereof, the intercepted information is a control message sent from the application and addressed to a display application. The control message comprising at least the information entity to be displayed on the display and indicating an appearance for displaying the information entity on the display and preferably a location for displaying the information entity on the display. The method also comprises forwarding the intercepted information including the reformatted appearance of the identified information entity to the display application.

Implementation details of the mobile device method are thereby further specified.

In a fourth possible implementation of the method according to the second aspect, or any of the earlier described possible implementations thereof, the information entity types comprise any of: person name, location, time, date, address, URL, phone number and/or email address presented as text, audio or image.

Thereby, the information entity types are further specified. By detecting and extracting these information entity types from a conversation on the mobile device (entered by the user or by the other part), an appointment concerning e.g. a flight, business meeting or doctor appointment may be detected and stored in a calendar application and a reminder may be set to remind the user of the appointment. Thus user experience is increased and mobile device usage is simplified.

In a fifth possible implementation of the method according to the second aspect, or any of the earlier described possible implementations thereof, the method also comprises denoting an event in the user's calendar application at the identified time/date according to the information entity when an information entity is identified as a time related information entity type.

By recognizing information calendar related information, e.g. in a chat text or message exchange, such recognized information may be inserted in the user's calendar program. Thereby the user is relieved from manual entrance of meeting data into the calendar program, which is time saving and convenient for the user. Also, the risk of mistyping data into the calendar program is reduced, or even omitted. Thereby the risk of missing a meeting, appointment or scheduled event is reduced.

In a sixth possible implementation of the method according to the second aspect, or any of the earlier described possible implementations thereof, the mapping between an identified information entity and the application is made, based on the information entity type, by mapping: a person name to a phone book application; a location to a map application; a time/date to a calendar application; an address to a map application; an URL to a web browser application; a phone number to an SMS application; and/or an email address to an emailing application.

Thereby, the information entity types are further specified. By detecting and extracting these information entity types from a conversation on the mobile device, an appointment concerning e.g. a flight, business meeting or doctor appointment may be detected and stored in a calendar application and a reminder may be set to remind the user of the appointment. Thus user experience is increased and mobile device usage is simplified.

In a seventh possible implementation of the method according to the second aspect, or any of the earlier described possible implementations thereof, the method further comprises reformatting appearance of the identified information entity in the application by rich text formatting when the information entity comprises text.

Thereby essential information in a text message may be immediately recognized and read by the user, thereby further enhancing user experience.

In an eighth possible implementation of the method according to the second aspect, or any of the earlier described possible implementations thereof, the method further comprises setting a reminder, reminding the user of an event denoted in the user's calendar application.

Thereby, the user may be notified about the detected event, assisting the user in avoiding missing the detected event.

In a ninth possible implementation of the method according to the second aspect, or any of the earlier described possible implementations thereof, the method further comprises adding a clickable event, linking to a calendar application, showing detailed information about the meeting.

Thus the user could easily find the event in the calendar application and e.g. check that the inserted data is correct and wherein the user may enter additional information into the calendar application.

According to a third aspect, a computer program with a program code for performing a method according to the second aspect, or any possible implementation thereof, when the computer program runs on a computer.

The advantages of the computer program according to the third aspect are the same as those for the corresponding device claims according to the first aspect and/or the method according to the second aspect. Thereby user experience is enhanced, based on user generated data extracted from an application in the mobile device.

Other objects, advantages and novel features of the aspects of the invention will become apparent from the following detailed description.

BRIEF DESCRIPTION OF THE DRAWINGS

Various embodiments are described in more detail with reference to attached drawings, illustrating examples of embodiments of the invention in which.

DETAILED DESCRIPTION

Embodiments of the invention described herein are defined as a mobile device and a method performed locally in a mobile device, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
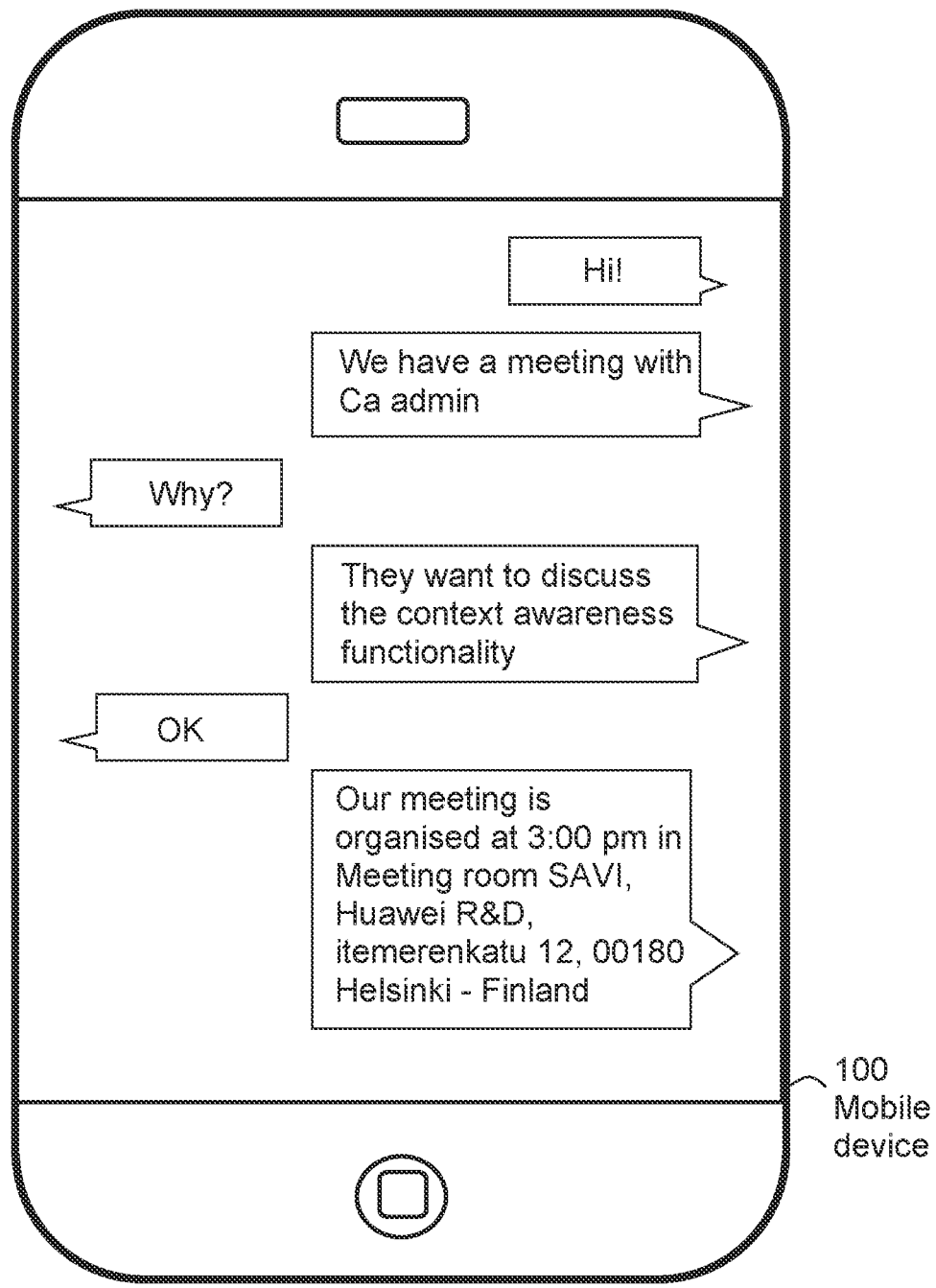
FIG. 1 is a block diagram illustrating a mobile device and a chat program conversation according to an embodiment.

FIG. 1 is a schematic illustration over a mobile device 100 and a conversation in a chat program environment.

The mobile device 100 may comprise a cellular telephone handset, a smartphone, a tablet, a mobile computer, a netbook, a laptop, a pair of smart glasses, a smartwatch, a gaming device, etc.

By studying how mobile users are using their mobile devices 100 for performing their daily life routines it becomes possible to build a very personalized services/applications that can meet the user's requirements and needs. The herein described method comprises a generic method for extracting textual content from 3rd party applications in the mobile device 100. The extracted and collected text may be analyzed using a client-side Named Entity Recognition (NER) service for adding text format and clickable events into the original text in an ambient way.

Various embodiments described herein contributes to the fields of smart mobile operating system and activity awareness computing. Specifically, is herein described a real-time approach for extracting textual content found in the mobile device 100. After having extracted and collected the data, all keywords and named entities are recognized with NER service. The result of the NER service will be used to visually annotate and format the text inside the application in ambient manner. In addition, some clickable events may be injected into the text. Such clickable events may be used to propose a new navigation model, the new clickable event may comprise a pair of executable activity and a data set. Further, according to some embodiments, the user is provided with ability to navigate directly to the app with a very fine-grained data. An example of those pairs could include {(Short Message Service (SMS) Application, Number://0443350640), (Call, ContactName://Mikko Terho), (View, url://www.huawei.com)}. In this sense, data refers to a user-generated content intercepted from the 3rd party applications fused with the data collected (autonomously) from the 3rd party applications. On the other hand, application executable refers to an end point of application that can be used to run/execute a specific data format like phone number, Uniform Resource Locator (URL), Location, or Image, etc. Having such features inside any 3rd party application could enrich the quality of user's experience.

According to some embodiments, the activity based computing solution may be able to first grasp the context, and then present data program pairs that fit the occasion in real-time. Here the basic user interaction model is to present the most relevant data program pair for interaction in an editable work area. Data is an item known to the consumer such as e.g., calendar event, contact in phonebook, e-mail, short message or URL to a relevant web page. View is the visualization part of the Model/View/Controller (MVC) concept that renders the item into the screen for interaction and editing. After completion of the interaction with the data, the system may automatically provide contextually most relevant data and actions for consequent interaction.

The ultimate objective of the described behavioral awareness model is to capture and intercept the user's activities invisibly running as ambient service. This invisible service is silently collecting the data without interfering or interrupting the user on-going tasks. Monitoring and detecting the textual content from 3rd party application in the mobile device 100, may gather all available information directly from the messaging loop of the mobile Operating System (OS), such as control messages comprising such information sent from the 3rd party application to a display application. This comprises information that can address the status and the action performed by the user on the mobile device 100 and the user's engagement with 3rd party applications like engagement in a conversation in social applications, posting on social media applications, sharing images/data, editing a contact card, calling a friend, sending SMS, or sending email, and similar applications for communication.

Some embodiments described herein contributes to the fields of smart mobile operating system and activity awareness computing. Specifically, a real-time approach for replacing the standard navigation model found in a mobile device 100 is presented. When the user receives a meeting request from a friend via a communication application such as e.g. Instant Messaging (IM) application, this text can be accessed and analyzed before it is shown on the display of the device. All mentioned Named Entities (such information entities of a predefined set of the information entities) in the conversation may be identified. In the same way, a new calendar event may be added to the calendar application in the mobile device 100. The event will comprise information such as location, time, and name of the person(s) involved in the meeting. In the same way, using a runtime text injection, this portion of text inside the IM application may be highlighted, e.g. by underlining the text or otherwise changing its visual appearance. In addition, a clickable event linked to the text portion may be added, so when the user clicks on the text portion, it will take the user to calendar application to show a detailed information about the meeting, in some applications. This functionality may be accomplished in ambient manner without distracting the user functionality of the mobile device 100.

Using a runtime mechanism within the mobile device 100, text may be extracted from a 3rd party application in the mobile device 100. Text elements may be stripped from the application view by extending the OS capability. The OS may be Android in some embodiments, as further discussed and exemplified herein. However, other OS such as e.g. iOS, Windows Phone, Blackberry, Firefox OS, Sailfish OS, Tizen, Ubuntu Touch, Linux and/or Symbian may be utilized in some alternative embodiments.

In some embodiments, the Android Activity manager may be modified to run a view debugger that may extract the text from Text View Fields in the View.

Figure 2:
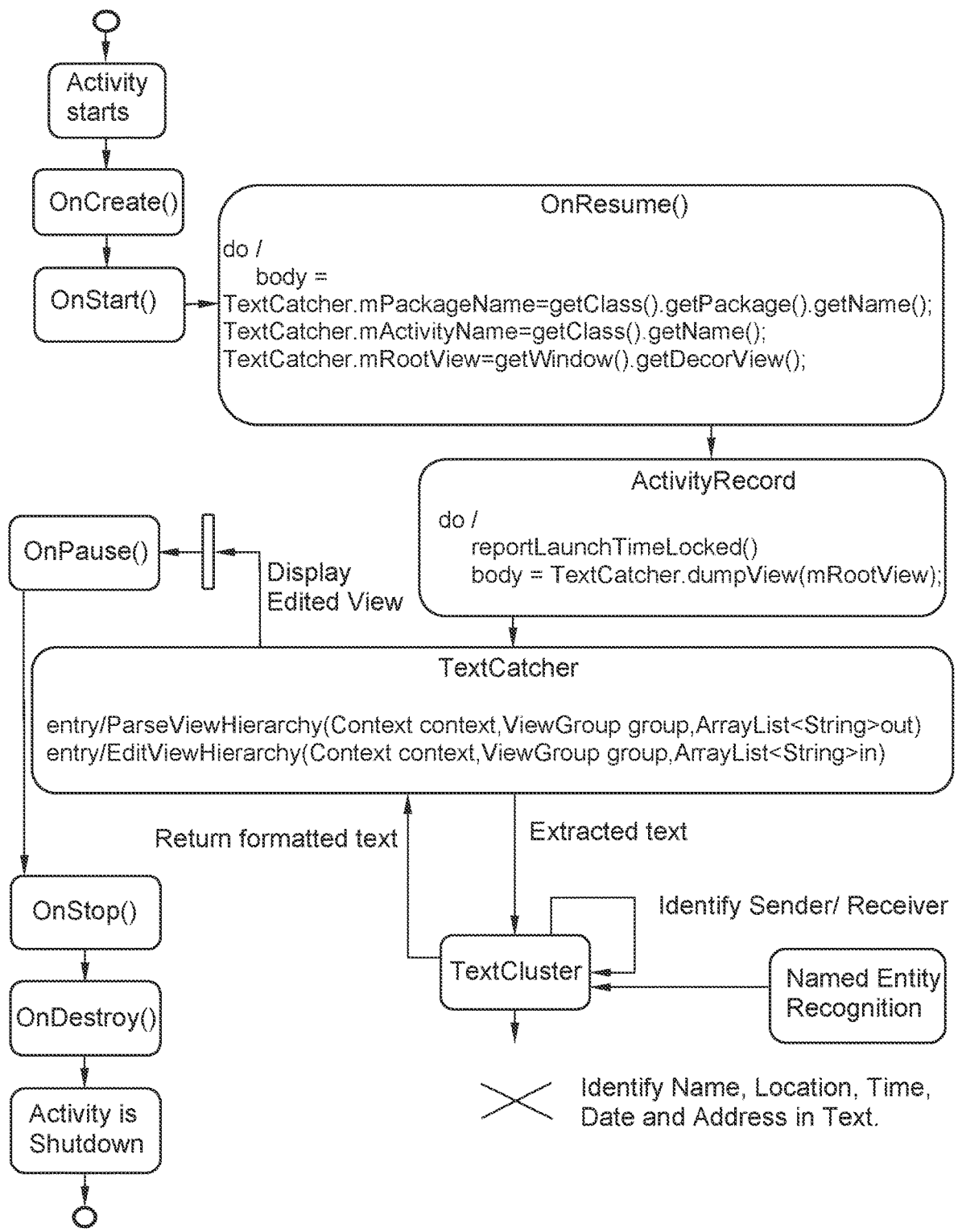
FIG. 2 is a flow chart illustrating a parse and edit view hierarchy according to an embodiment.

By using a TextCatcher program, text may be extracted from the view shown in FIG. 1. The mechanism of extracting the textual information may require modifying and extending the Android Activity life cycle in such a way it may call the TextCatcher program and pass to it the view structure. Android View may be structured as a Tree of root node call mRoot and all User Interface (UI) elements in the view are structured as children nodes. This is a general rule of construction, building and drawing the UI elements in the view managed by the Android View Manager. To pass the View tree the Android Activity Manager may be extended to pass the mRoot view, package name, and view name to the TextCatcher program as shown in FIG. 2.

The TextCatcher class may, in some embodiments, be running inside the android.util package as part of the Android core framework. When the Activity is created in the mobile device 100 for the user, the "onResume( )" function in class Activity.Java pass the Package name, Activity name, and mRootView of the application to the TextCatcher class. Normally, the Android Activity Manager call the function "reportLaunchTimeLocked( )" from ActivityRecord.Java to confirm that the view is completely displayed to the user. This function may be extended in some embodiments, to call our "dumpView" function in the TextCatcher class. The dumpView function parses the Tree structure of Andorid View by identifying all TextViews in the tree. Once a TextView is found, its text content passed to TextCluster class, TextCluster implements a clustering algorithm to identify message content, sender name, receiver name, and the usefulness of the text. The Cluster Algorithm is demonstrated in FIG. 5.

The algorithm may use a HashMap data structure to analyze the raw text and text attributes. The text may in some embodiments be clustered into three HashMaps (left, right, Unknown) based on their appearance in the view. Thus the TextView is clustered based on the coordinates of their position in the view. Thereby the source of the message in the TextView may be identified.

Normally, in Instant Messaging (IM) applications, the received text appears in the left side of the View. The sender text appears in the right side of the view as shown in FIG. 1. In the FIG. 1, the receiver is Basel and the sender is the CA admin. Using the coordinates, it may be identified weather the TextView should be cluster to the left cluster or right cluster based on its distance from the view centre.

Figure 3:
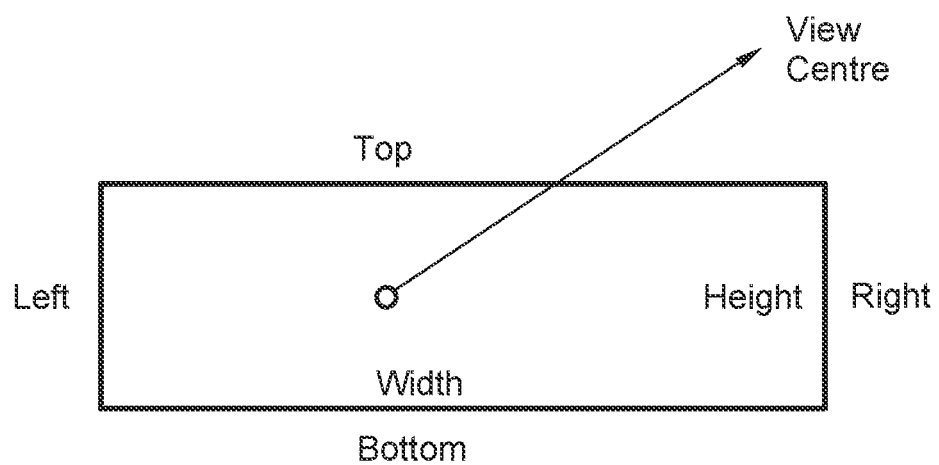
FIG. 3 is a block diagram illustrating a text View Centre according to an embodiment.
Figure 4:
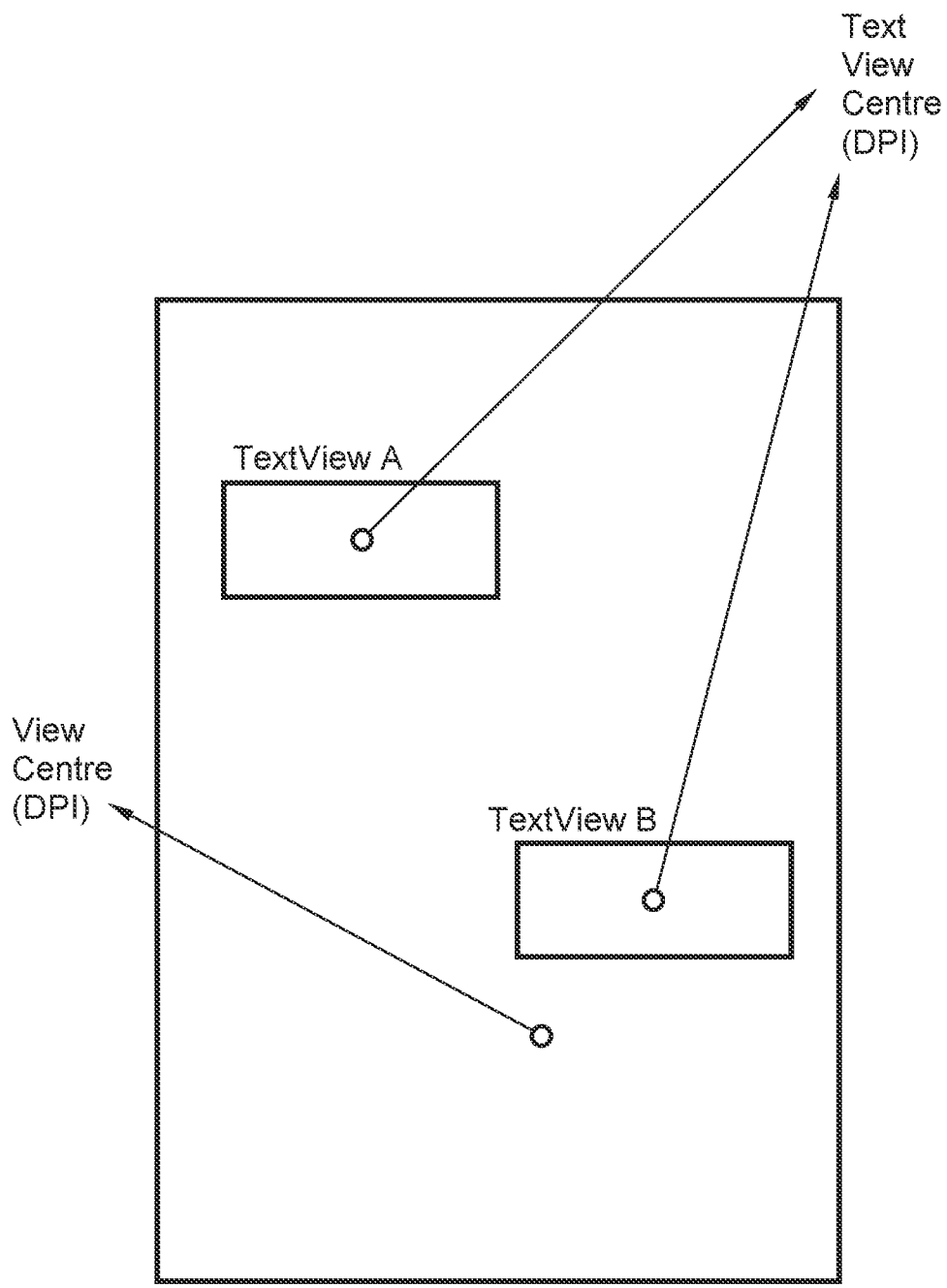
FIG. 4 is a block diagram illustrating a View Centre according to an embodiment.

Each mobile device model has a specific value of Density-independent Pixel (DP), for example, Nexus 5, has 480 DPI. DP is a virtual pixel unit that is used when defining UI layout, to express layout dimensions or position in a density-independent way. For each TextView the Centre DP value may be calculated, assuming the TextView has a rectangular shape as shown in FIG. 3. Thus the position of the centre of the TextView rectangle is calculated/determined and compared with centre value of the parent view as shown in FIG. 4.

The following equations are used to calculate the required values:

$$dp=px/(Device\_dp/160); \qquad \text{Eq 1:}$$

$$X=(left+right)/2; \qquad \text{Eq 2:}$$

$$Y=(top+bottom)/2; \qquad \text{Eq 3:}$$

$$TextView\_Center\_DP=(X,Y); \qquad \text{Eq 4:}$$

$$View\_centre\_DP=(ViewX,ViewY). \qquad \text{Eq 5:}$$

For example in Google Nexus 5: ViewX=480/160, ViewY=1060/160.

Figure 5:
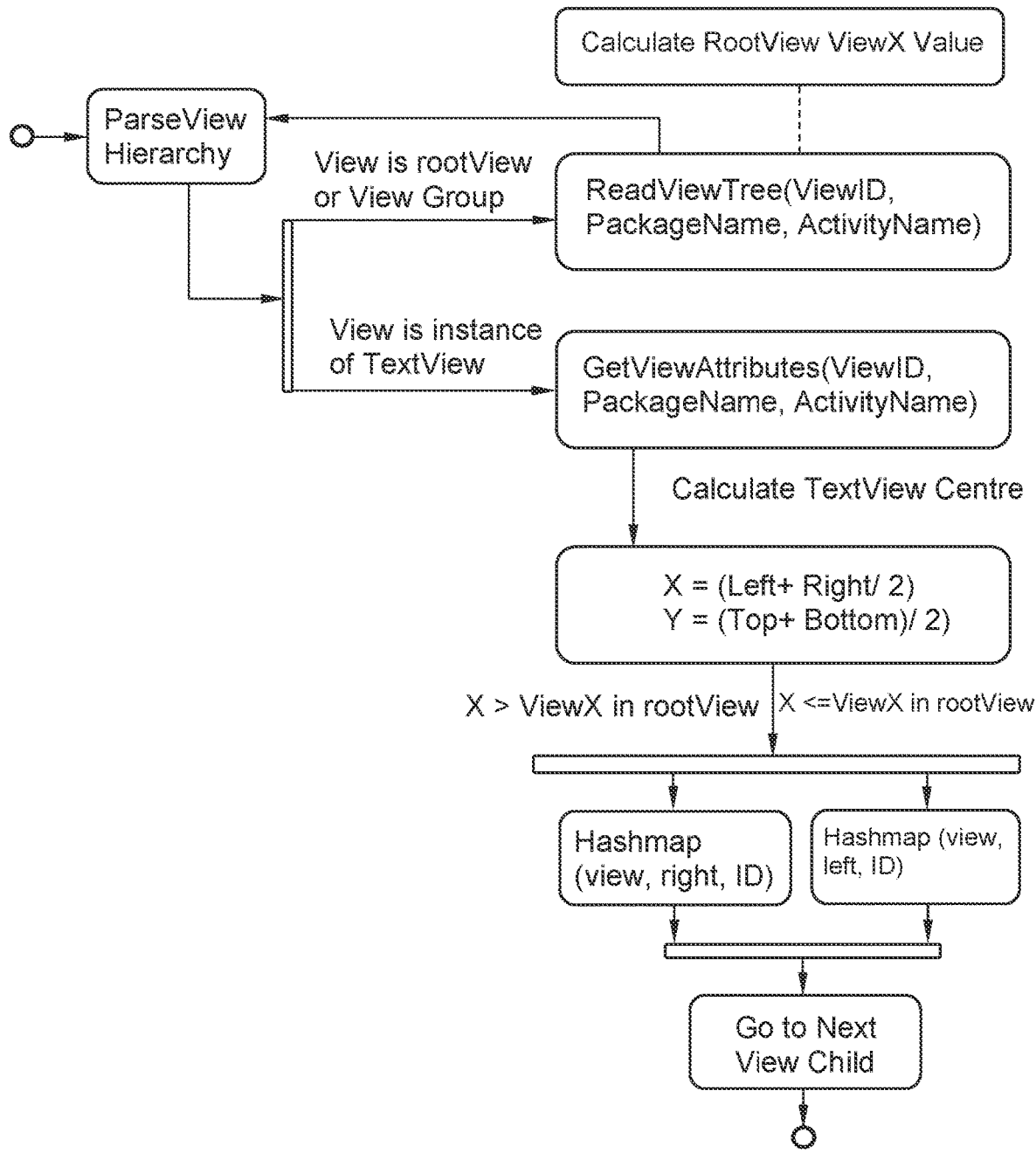
FIG. 5 is a flow chart illustrating data flow of clustering text view based on location, according to an embodiment.

Density-independent pixel (DP): A virtual pixel unit that is used when defining UI layout. This method may be used to express layout dimensions or position in a density-independent way. The DP is equivalent to one physical pixel on a 160 dpi screen, which is the baseline density assumed by the system for a "medium" density screen. At runtime, the system transparently handles any scaling of the DP units, as necessary, based on the actual density of the screen in use. The conversion of DP units to screen pixels is simple: px=DP*(dpi/160). For example, on a 240 dpi screen, 1 DP equals 1.5 physical pixels. FIG. 5 provides an overview of the algorithm used to cluster the Text View based on its location against the centre of its root view.

Both clusters of Text Views are filtered to remove duplication and unnecessary words. After identifying a useful portion of text, the TextCluster passes the text to a Named Entity Service (NERS). The NER service identifies if the text comprises Name, Location, Time and Address, etc. The NER services enclosed named entities of text by special symbols; each symbol is used to identify a class of named entities. For example, for each portion of text that has been identifies as a time expression, the NER service add the Symbol "%%" before and after the text. The NER services may use the function "surroundExactMatch(String text, String exact, String preTag, String postTag)", for example, surroundExactMatch(text,"Finland", "##", ##") indicated the sub string Finland is a named entity for a location. Each Named Entity (i.e. person name, address, location, URL, phone number, email, time and date) may be surrounded with a special character, each special character is identifying the text format that can be applied to this portion of text, in some embodiments.

Figure 6:
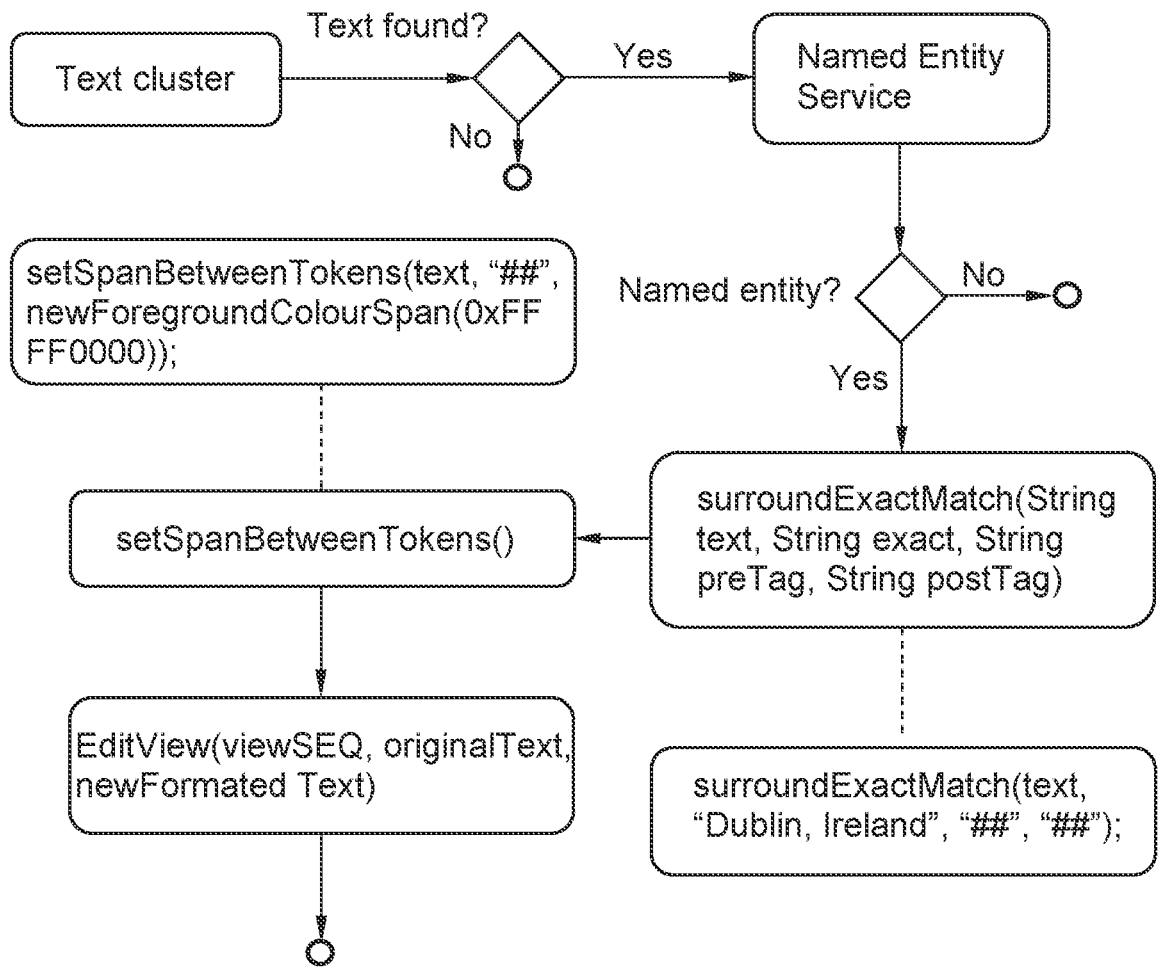
FIG. 6 is a flow chart illustrating text formatting according to an embodiment.
Figure 7A:
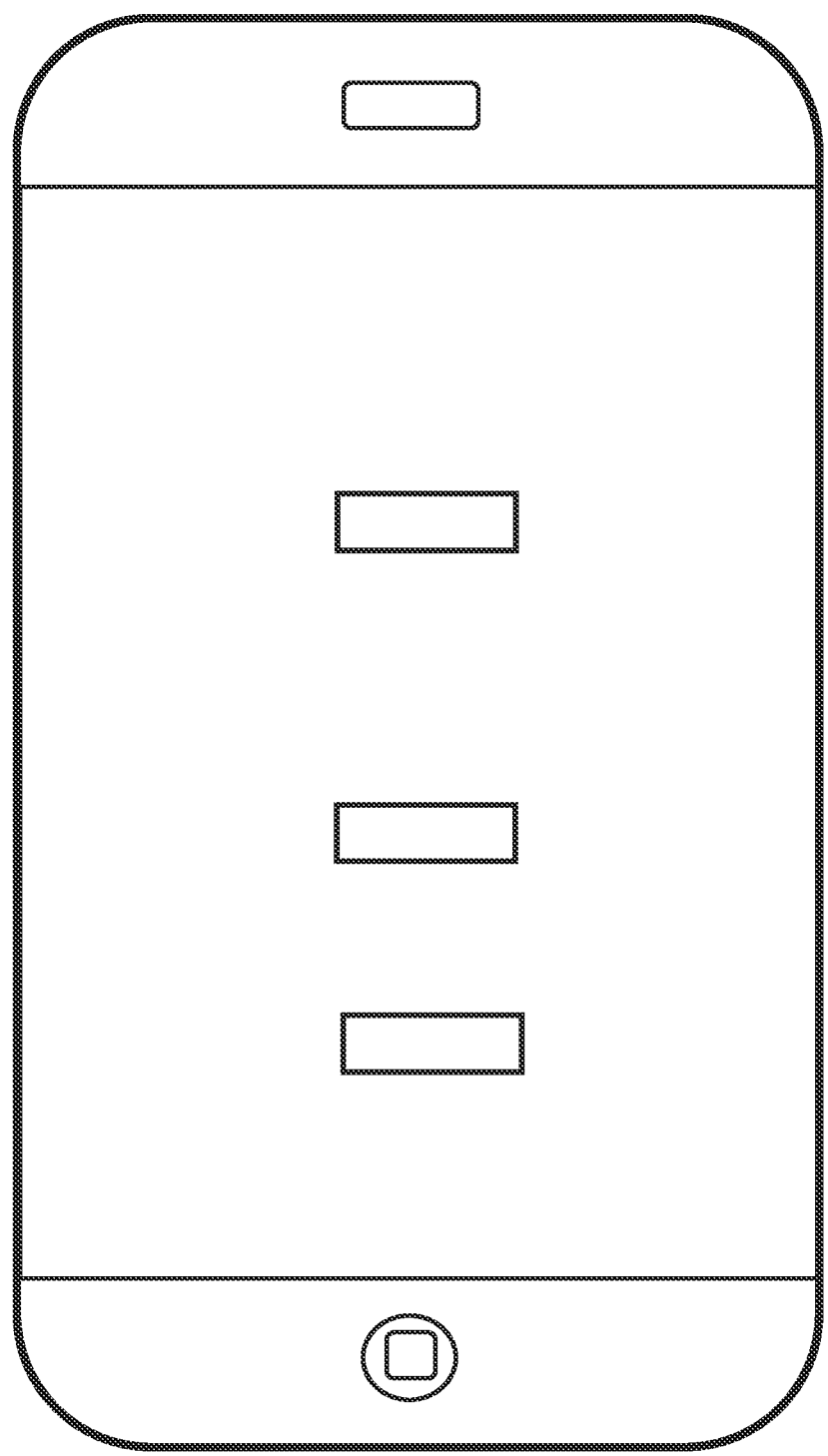
FIG. 7A is a block diagram illustrating a mobile device and a chat program conversation according to an embodiment.
Figure 7B:
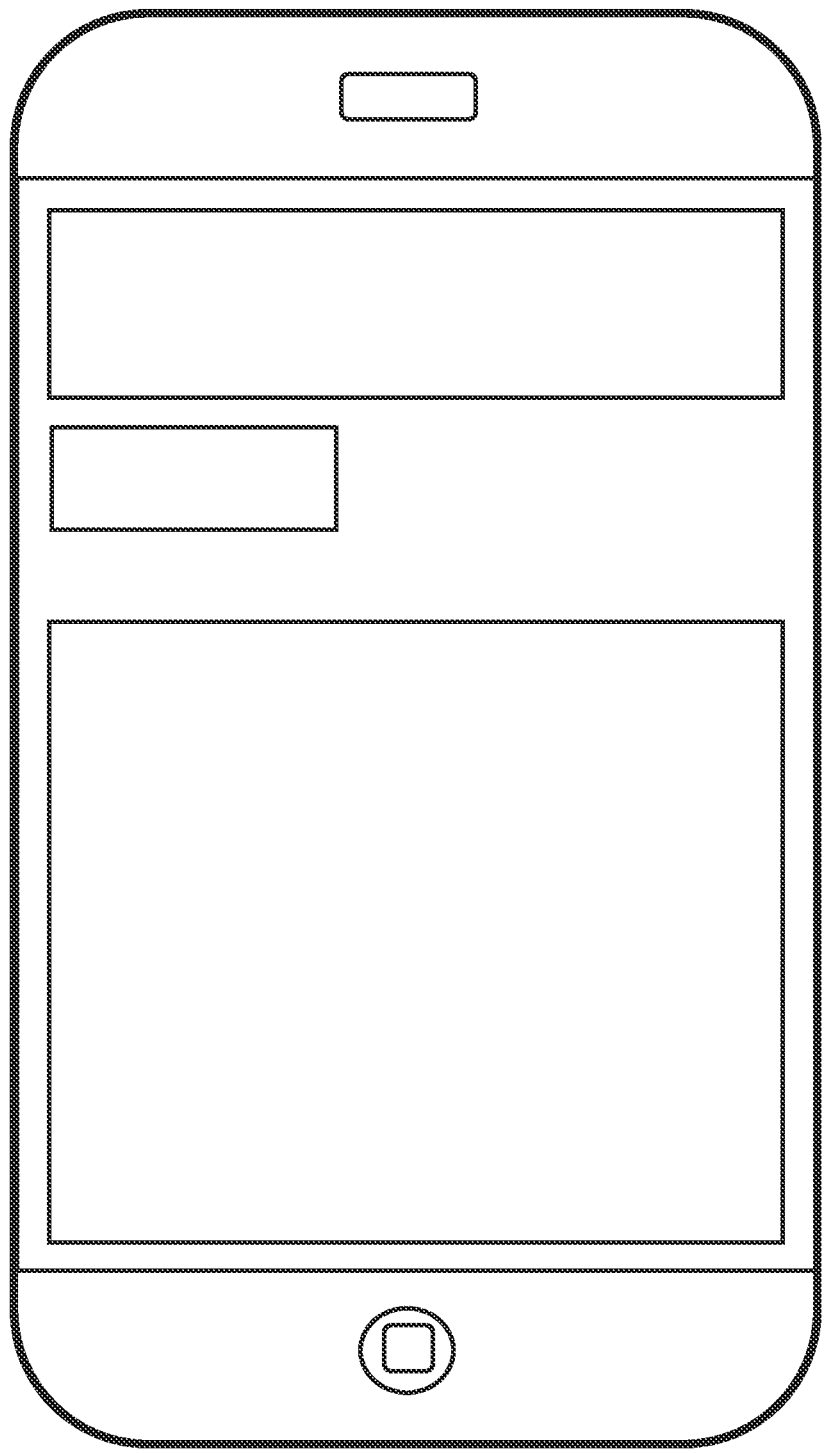
FIG. 7B is a block diagram illustrating a mobile device and a chat program conversation according to an embodiment.
Figure 7C:
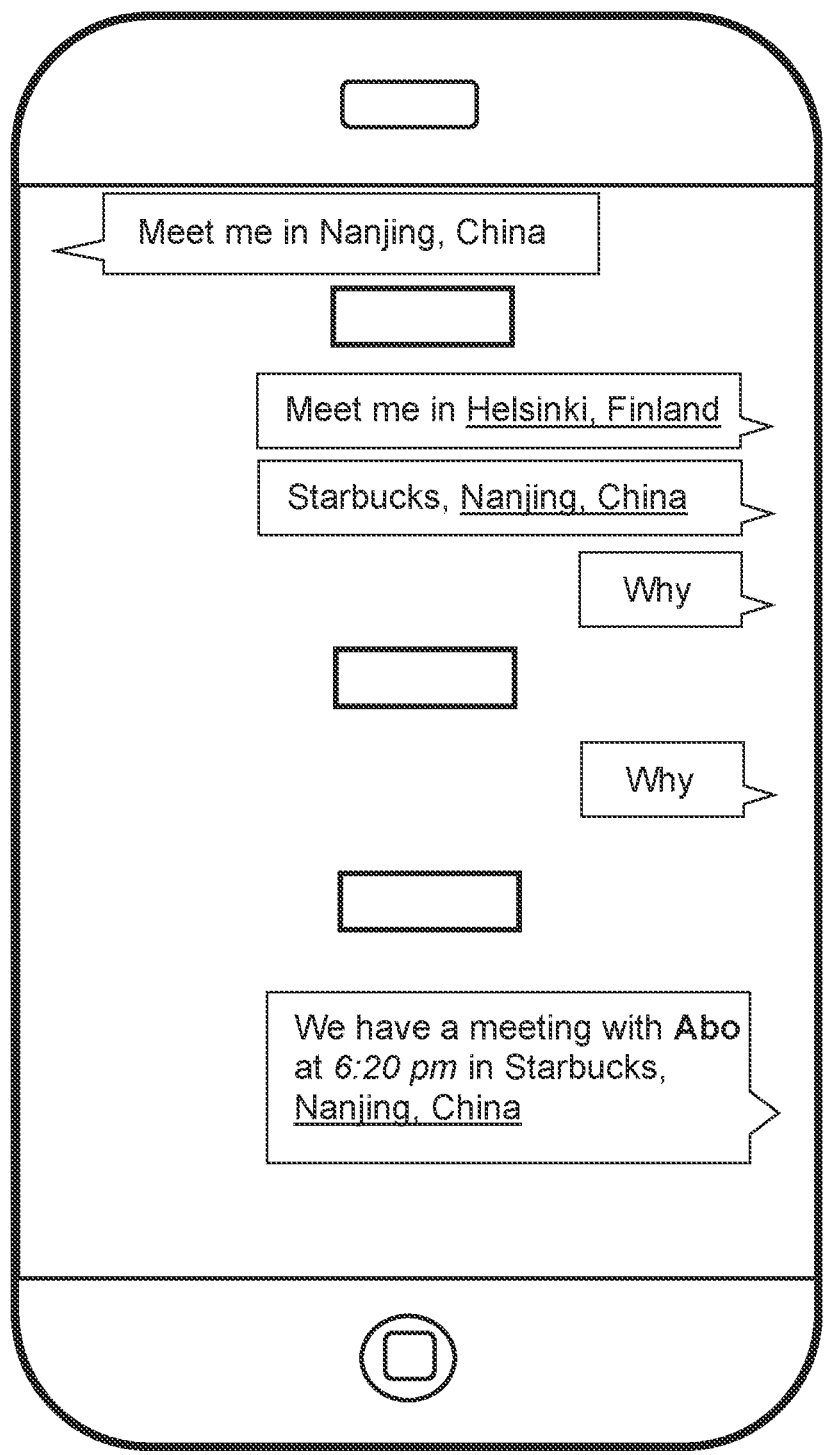
FIG. 7C is a block diagram illustrating a mobile device and a chat program conversation according to an embodiment.

The result of named entities may be returned to the TextCluster class. After receiving a list of Named Entities, the TextCluster may use "setSpanBetweenTokens( )" function to inject text formation and clickable events based on the special characters embedded in the text in the previous step. The new formatting and the view sequence may be passed to a function that able to edit the view node using the view sequence id. After finding the right node, the new text may be injected in it. The process of identifying a meaning full text and formatting it is shown in FIG. 6, concerning Text formatting. The outcome from analyzing and formatting the text is demonstrated in the storyboard shown in FIG. 7A-7C.

Thus the method provides a mechanism for extracting, analyzing and formatting user's generated content from third party applications in a mobile device 100, without having any information sent or treated outside the mobile device 100. In some embodiments, Android Operating System View structure is used to reveal meaningful content. Further, TextView attributes may be used to identify the location and source of the text. The text might come from the user of the mobile device 100, or someone who has sent this text to the user. In some embodiments, the centre of the text view may be used to identify its location relatively to the parent view. Further, a runtime text formatting may be made to inject text formatting at runtime so the text may be formatted based on being e.g. a name, location, time or address.

The Named Entity Service is running locally at the mobile device 100 to improve the privacy of the user. The collected data is not sent or redirected to any external entity such as e.g. a cloud based service or server.

The described embodiments may be used to collect a useful and meaningful content and analysis by using a machine-learning algorithm. Having such an algorithm, the mobile device 100 could predict the next pair of user action data. Such prediction may be used to propose a new navigation model, comprising a pair of executable activity and a data set.

In some embodiments, the user may be provided with a list of application and data pairs, so the mobile user can navigate directly to the app with a very fine-grained data. An example of those application and data pairs may comprise: {(SMS Application, Number://0443350640), (Call,Contact-Name://Mikko Terho), (View, url://www.huawei.com)}. In this context, data refers to a user-generated content intercepted from the mobile OS messaging loop, which also is fused with sensory data collected autonomously from the mobile device 100. Application executable refers to an end point of application that can be used to run/execute a specific data format like phone number, URL, location, or image.

The activity based computing solution according to embodiments disclosed herein may ultimately be able to firstly grasp the context, and then present data program pairs that fit the occasion in real-time. The most relevant data program pair for interaction may be presented for the user in an editable work area on the display of the mobile device 100.

Data in the here used meaning may comprise an item known to the user such as e.g. calendar event, contact in phonebook, e-mail, short message or URL to a relevant web page, etc. View is the visualization part of the Model/View/Controller (MVC) concept that renders the item into the display for interaction and editing. After completion of the interaction with the data, the system may automatically provide the contextually most relevant items and actions for consequent interaction.

In some of the described implementation embodiments, multiple items may be presented for the user to select between. Every time the user chooses to navigate via our proposed prediction the system may improve its own accuracy as it learns from the choices the user is making, according to some embodiments.

This type of computing environment, based on current state and predicted next state, may become data centric and moderate the current application model. In some embodiments e.g. in the widget example illustrated in FIGS. 7A-7C, a new prediction may already be computed and proposed.

This home screen widget may predict a list of apps & data pairs to be used as shortcut for navigation, at certain time periods. Once the user selects the website icon it may navigate the user the stack overflow website.

Figure 8:
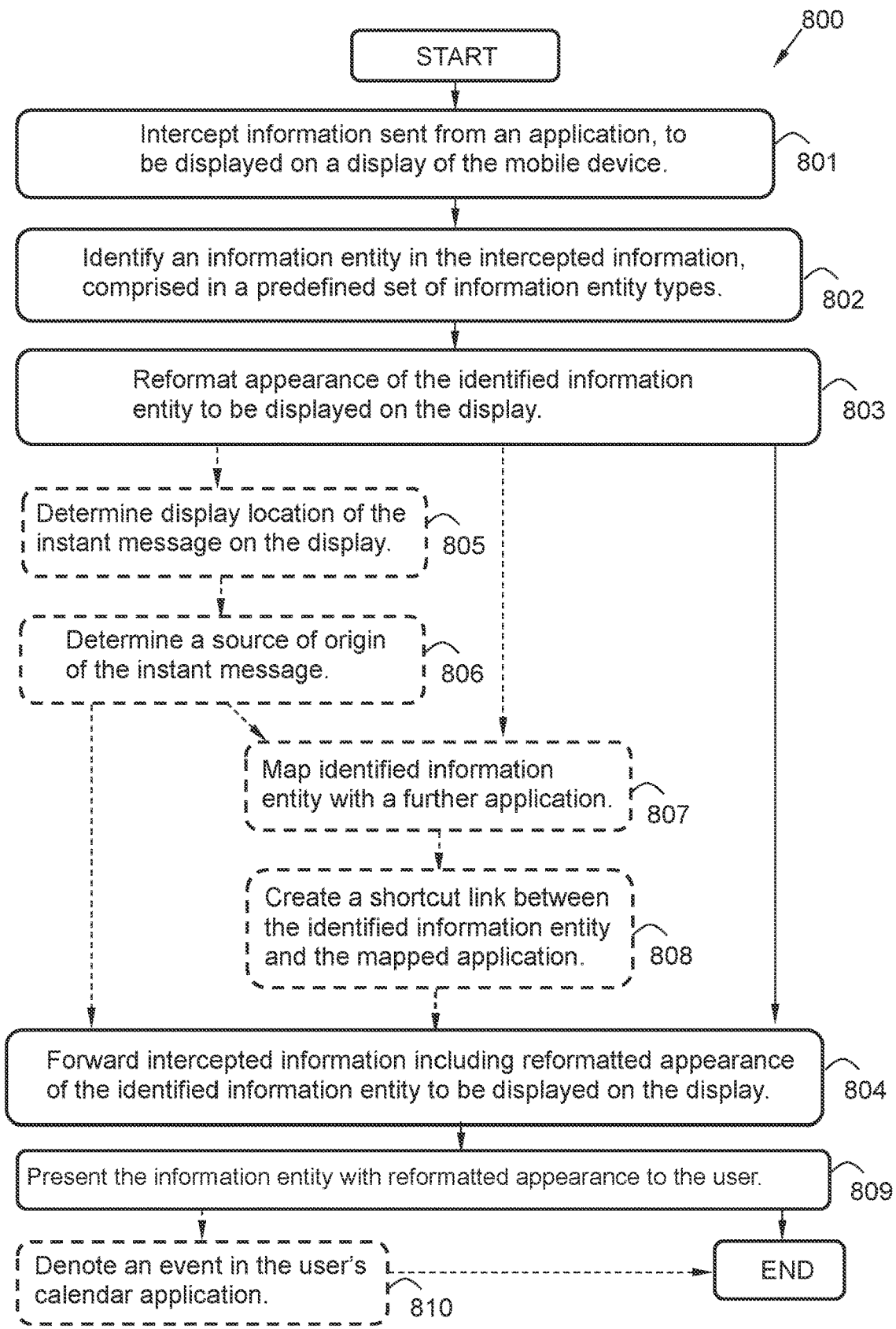
FIG. 8 is a flow chart illustrating a method in a mobile device according to an embodiment of the invention.

FIG. 8 is a flow chart illustrating embodiments of a method 800 performed locally in a mobile device 100 for enhancing user experience, based on user generated data extracted from an application running in the mobile device 100.

The application may be a communication application such as SMS, e-mail, Instant Messaging (IM), or any other chat program or communication program.

To appropriately perform the method 800 locally in a mobile device 100, without exporting any data out of the mobile device 100 and enhance user experience, the method 800 may comprise a number of steps 801-810. It is however to be noted that any, some or all of the described step 801-810, may be performed in a somewhat different chronological order than the enumeration indicates, be performed simultaneously or even be performed in a completely reversed order according to different embodiments. Some method steps such as e.g. step 806-808 and 810 may be performed within some, but not necessarily all embodiments. Further, it is to be noted that some steps may be performed in a plurality of alternative manners according to different embodiments, and that some such alternative manners may be performed only within some, but not necessarily all embodiments.

Any, some or all of step 801-810 may in some embodiments be periodically re-performed. The method 800 may comprise the following steps:

Step 801 comprises intercepting information sent from an application, to be displayed on a display 940 of the mobile device 100.

The intercepted information may comprise user information input of the application.

The user information input may be made by the user of the mobile device 100, or the communication partner of the user. The user information input may comprise text, drawings, images, graphics, format, position or audio in different embodiments.

Step 802 comprises identifying an information entity in the intercepted information, comprised in a predefined set of information entity types.

Such predefined set of information entity types may comprise any of: person name, location, time, date, address, URL, phone number and/or email address presented as text, audio or image.

Step 803 comprises reformatting appearance of the identified information entity to be displayed on the display 940.

The reformatting of the information appearance may be made when the intercepted information is comprised in the predefined set of information entity types, in some embodiments.

The reformatted appearance of the identified information entity may be based on a determined source of origin, in some embodiments, i.e. the user of the mobile device 100, or his/her communication partner.

The reformatted appearance of the identified information entity in the application may comprise e.g. rich text formatting in some embodiment, when the information entity comprises text.

Step 804 comprises forwarding the intercepted information including the reformatted appearance of the identified information entity to be displayed on the display 940.

However, in further embodiments some further steps may be performed before the intercepted information with the reformatted appearance is forwarded to display. As an example, a short cut link may be added or some further analysis of the information entity can be performed, as described in the following steps. It should be emphasized that the following steps could also be performed before step 803 or as part of step 803.

Step 805, which may be performed only in some embodiments, may comprise determining a display location of the instant message on the display 940, based on the intercepted 801 information, when the application is an instant messaging application and the intercepted 801 information comprises an instant message.

Instant Messaging (IM) is a set of communication technologies used for real-time text-based communication between two or more participants over the Internet or other types of networks. Short messages are typically transmitted bi-directionally between two parties, when each user chooses to complete a thought and select "send". Some instant messages applications can use push technology to provide real-time text, which transmits messages character by character, as they are composed. In some embodiments, instant messaging can add e.g. file transfer, clickable hyperlinks, Voice over IP (VoIP), and/or video chat.

Further, in some embodiments, instant messaging may be made also when the receiver is off line.

Step 806, which only may be performed in some embodiments wherein step 805 has been performed, may comprise determining a source of origin of the instant message based on the determined 805 display location.

The source of origin of the instant message may be the user of the mobile device 100, or the communication partner of the user. The user information input may comprise text, drawings, images, graphics, format, position and/or audio, or any combination thereof, in different embodiments.

Step 807, which may be performed only in some embodiments, may comprise mapping the identified 802 information entity with a further application, based on the information entity type of the identified 802 information.

The mapping between an identified 802 information entity and the application may be made based on the information entity type, by mapping: a person name to a phone book application; a location to a map application; a time/date to a calendar application; an address to a map application; an URL to a web browser application; a phone number to an SMS application; and/or an email address to an emailing application, in some embodiments.

Step 808, which only may be performed in some embodiments wherein step 807 has been performed, may comprise creating a shortcut link between the identified 802 information entity and the mapped 807 application.

The shortcut link may be a handle in a user interface that allows the user to find a file or resource located in a different directory or folder from the place where the shortcut link is located. The shortcut link may be implemented as a small file comprising a target Uniform Resource Identifier (URI) to an object, or the name of a target program file that the shortcut represents.

The shortcut link may be touchable so that the user is enabled to access the mapped 807 application via the shortcut link when touching it on a touch display of the mobile device 100.

In some embodiments, the shortcut link may be linking to a calendar application, showing detailed information about the meeting. The shortcut link may be a clickable event comprising a highlighted link in some embodiments, or e.g. a recognizable logotype.

Step 809 comprises presenting the identified 802 information entity with the reformatted 803 appearance to the user of the mobile device 100.

Step 810, which may be performed only in some embodiments, may comprise denoting an event in the user's calendar application at the identified time/date according to the information entity, when an information entity is identified 802 as a time related information entity type.

Further, in some embodiments, the user of an event denoted in the user's calendar application may be reminded by setting an alarm. The optional alarm (based on a sound, a light, a tactile signal or a combination of these) may be set a (brief) period in advance to the event in the calendar application.

Figure 9:
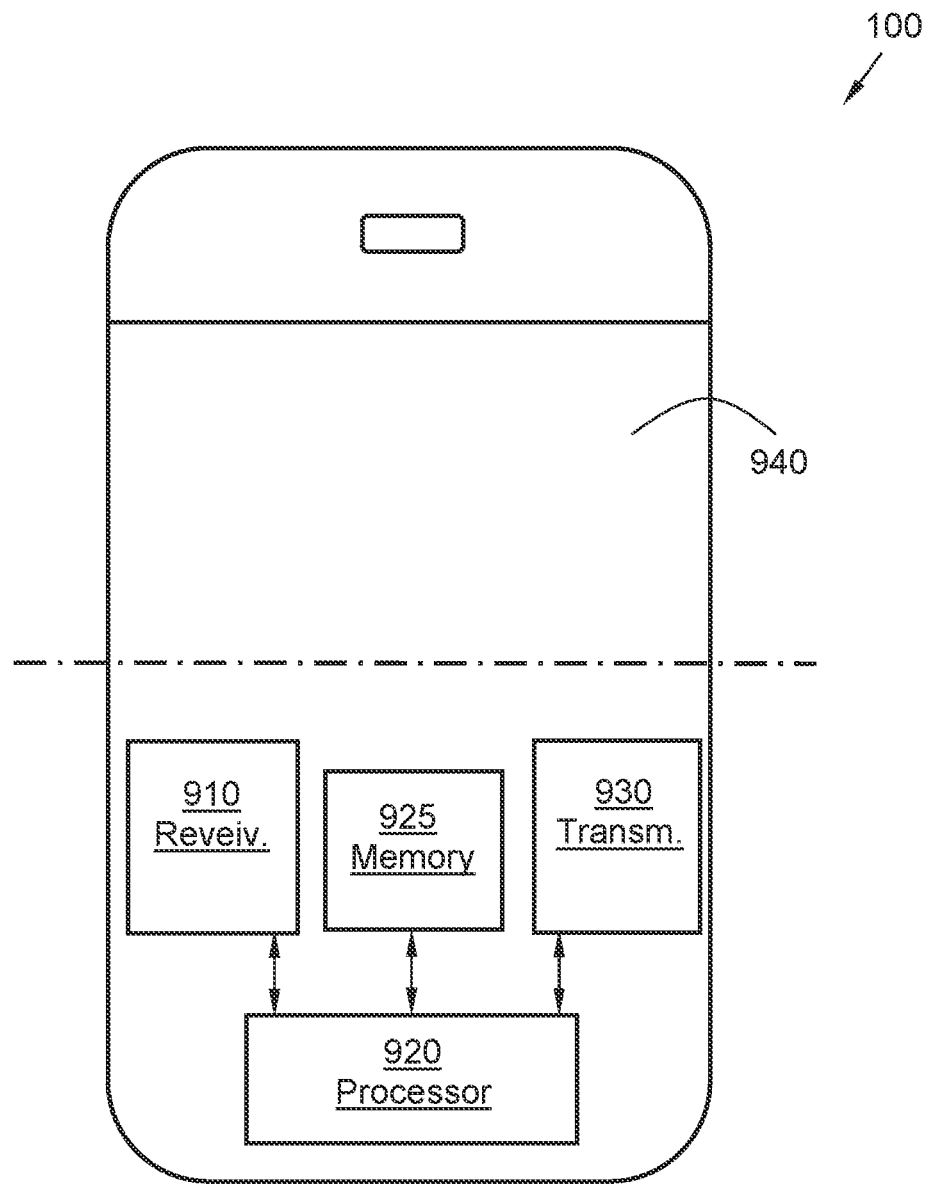
FIG. 9 is a block diagram illustrating a mobile device according to an embodiment of the invention.

FIG. 9 illustrates an embodiment of a mobile device 100 for enhancing user experience, based on user generated data from an application running in the mobile device 100. The mobile device 100 may perform at least some of the above described method steps 801-810.

The mobile device 100 comprises a processor 920, configured to intercept information sent from an application, to be displayed on the display 940, e.g. via a software module responsible for displaying the content. The information may comprise e.g. a display command comprising text, graphics, format, position, etc. The processor 920 is also configured to identify an information entity in the intercepted information, comprised in a predefined set of information entity types. Further the processor 920 is further configured to reformat appearance of the identified information entity to be displayed on the display 940, e.g. when the information entity is comprised in the predefined set of information entity types. Further the processor 920 is additionally configured to forward the intercepted information including the reformatted appearance of the identified information entity to be displayed on the display 940, e.g. by a software module responsible for displaying the information content.

The mobile device 100 also comprises a display 940 configured to present the identified information entity with the reformatted appearance to the user of the mobile device 100.

The processor 920 may in some embodiments be configured to determine a display location of the instant message on the display 940, based on the intercepted information. The processor 920 may furthermore be configured to determine a source of origin of the instant message based on the determined display location. Also, the processor 920 may be configured to reformat the appearance of the identified information entity based on the determined source of origin, when the application is an instant messaging application and the intercepted information comprises an instant message.

The processor 920 may in some further embodiments be configured to map the identified information entity with a further application, based on the information entity type of the identified information. Further, the processor 920 may be additionally configured to create a shortcut link between the identified information entity and the mapped application. The shortcut link may comprise a transfer of the identified information entity to the other mapped application, in some embodiments.

Further, the display 940 may be configured to display the shortcut link in some embodiments.

The processor 920 may in some embodiments be configured to add a shortcut link, linking to a calendar application, showing detailed information about e.g. a meeting, in case the information indicates a meeting is going to take place.

In some embodiments, wherein the intercepted information is a control message sent from the application and addressed to a display application, the control message comprising at least the information entity to be displayed on the display 940 and indicating an appearance for displaying the information entity on the display 940 and preferably a location for displaying the information entity on the display 940, the processor 920 may be configured to forward the intercepted information including the reformatted appearance of the identified information entity to the display application.

The processor 920 may in some embodiments be configured to identify information entity types comprising any of e.g.: person name, location, time, date, address, URL, phone number and/or email address presented as text, audio and/or image.

In some embodiments, the processor 920 may be further configured to denote an event in the user's calendar application at the identified time/date according to the information entity, when an information entity is identified as a time related information entity type.

The processor 920 may also be further configured to map the identified information entity and the application based on the information entity type, by mapping: a person name to a phone book application; a location to a map application; a time/date to a calendar application; an address to a map application; an URL to a web browser application; a phone number to an SMS application; and/or an email address to an emailing application.

Further, the processor 920 may be further configured to reformat appearance of the identified information entity in the application by rich text formatting when the information entity comprises text, in some embodiments.

In some embodiments, the processor 920 may in addition be configured to set a reminder, reminding the user of an event denoted in the user's calendar application.

Such processor 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the mobile device 100 also may comprise a receiving circuit 910 in some embodiments, for receiving wireless signaling.

The mobile device 100 also may comprise a transmitting circuit 930, configured to transmit wireless signals.

Furthermore, the mobile device 100 in addition may comprise at least one memory 925, according to some embodiments. The optional memory 925 may comprise a physical device utilized to store data or programs, i.e., sequences of instructions, on a temporary or permanent basis. According to some embodiments, the memory 925 may comprise integrated circuits comprising silicon-based transistors. Further, the memory 925 may be volatile or non-volatile.

The method 800 comprising at least some of the method steps 801-810 may be implemented through the one or more processors 920 in the mobile device 100 together with computer program product for performing the functions of the method 800.

Thus a computer program comprising program code for performing the method 800 according to any embodiment of method steps 801-810, may be performed when the computer program is loaded in the processor 920.

The computer program product mentioned above may be provided for instance in the form of a data carrier carrying computer program code for performing at least some of the method steps 801-810 according to some embodiments when being loaded into the processor 920. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the mobile device 100, e.g., over an Internet, WiFi or intranet connection.

The terminology used in the description of the embodiments as illustrated in the accompanying drawings is not intended to be limiting of the described method 800 and mobile device 100. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A computer device comprising:
a display;
at least one processor configured to:
intercept information to be displayed on the display;
identify, in the intercepted information, an information entity that matches at least one information entity type in a predefined set of information entity types, wherein the predefined set of information entity types comprises person name, address, and phone number, and wherein each information entity type in the predefined set of information entity types has a corresponding relationship with a mapped application;
reformat appearance of the identified information entity to be displayed on the display, wherein the mapped application is an instant messaging application, the intercepted information comprises an instant message when identifying the information entity that matches the at least one information entity type in the predefined set of information entity types, and display the intercepted information including the reformatted appearance of the identified information entity on the display, wherein the reformatted appearance of the identified information entity is different from an appearance of the remaining portion of the intercepted information;

map the identified information entity with a mapped application, based on the information entity type of the identified information entity and the corresponding relationship;

create a shortcut link between the identified information entity and the mapped application, wherein the shortcut link causes the mapped application to execute on the computer device when selected; and display the shortcut link.

2. The computer device according to claim 1, wherein the intercepted information is a control message sent from the mapped application and addressed to a display application, the control message comprising at least the information entity to be displayed on the display and indicating an appearance for displaying the information entity on the display and a location for displaying the information entity on the display; and wherein the at least one processor is configured to forward the intercepted information including the reformatted appearance of the identified information entity to the display application.

3. The computer device according to claim 1, wherein the at least one processor is further configured to change appearance of the identified information entity in the mapped application by rich text formatting when the information entity comprises text.

4. A displaying method, comprising:

intercepting information sent through an application, to be displayed on a display of a computer device;

identifying, by an operating system of the computer device or the application, in the intercepted information, an information entity that matches at least one information entity type in a predefined set of information entity types, wherein the predefined set of information entity types comprises person name, address, and phone number, and wherein each information entity type in the predefined set of information entity types has a corresponding relationship with a mapped application;

when identifying the information entity that matches the at least one information entity type in the predefined set of information entity types, reformatting appearance of the identified information entity to be displayed on the display, wherein the application is an instant messaging application, the intercepted information comprises an instant message, and displaying the intercepted information including the reformatted appearance of the identified information entity on the display, wherein the reformatted appearance of the identified information entity is different from an appearance of the remaining portion of the intercepted information;

mapping the identified information entity with a mapped application, based on the information entity type of the identified information entity and the corresponding relationship;

creating a shortcut link between the identified information entity and the mapped application, wherein the shortcut link causes the mapped application to execute when selected; and displaying the shortcut link on the computer device.

5. The displaying method according to claim 4, wherein the intercepted information is a control message sent from the application and addressed to a display application, the control message comprising at least the information entity to be displayed on a display and indicating an appearance for displaying the information entity on the display and a location for displaying the information entity on the display; and wherein the displaying method further comprises:

forwarding the intercepted information including the reformatted appearance of the identified information entity to the display application.

6. The displaying method according to claim 4, wherein the displaying method further comprises: changing appearance of the identified information entity in the application by rich text formatting when the information entity comprises text.

7. A non-transitory computer-readable medium storing a program code which, when executed by a computer, causes the computer to perform operations comprising:

intercepting information sent through an application, to be displayed on a display of a computer device;

identifying, by an operating system of the computer device or the application, in the intercepted information, an information entity that matches at least one information entity type in a predefined set of information entity types, wherein the predefined set of information entity types comprises person name, address, and phone number, and wherein each information entity type in the predefined set of information entity types has a corresponding relationship with a mapped application;

when identifying the information entity that matches the at least one information entity type in the predefined set of information entity types, reformatting appearance of the identified information entity to be displayed on the display, wherein the application is an instant messaging application, the intercepted information comprises an instant message, and displaying the intercepted information including the reformatted appearance of the identified information entity on the display, wherein the reformatted appearance of the identified information entity is different from an appearance of the remaining portion of the intercepted information;

mapping the identified information entity with a mapped application, based on the information entity type of the identified information entity and the corresponding relationship;

creating a shortcut link between the identified information entity and the mapped application, wherein the shortcut link causes the mapped application to execute when selected; and displaying the shortcut link on the computer device.

8. The non-transitory computer-readable medium according to claim 7, wherein the intercepted information is a control message sent from the application and addressed to a display application, the control message comprising at least the information entity to be displayed on a display and indicating an appearance for displaying the information entity on the display and a location for displaying the information entity on the display; and wherein the operations comprise:

forwarding the intercepted information including the reformatted appearance of the identified information entity to the display application.

9. The non-transitory computer-readable medium according to claim 7, wherein the operations comprise: changing appearance of the identified information entity in the application by rich text formatting when the information entity comprises text.

\* \* \* \* \*

UNITED STATES PATENT AND TRADEMARK OFFICE
CERTIFICATE OF CORRECTION

| | | |
|---|---|---|
| PATENT NO. | : 12,099,795 B2 | Page 1 of 1 |
| APPLICATION NO. | : 18/320426 | |
| DATED | : September 24, 2024 | |
| INVENTOR(S) | : Basel Magableh | |

It is certified that error appears in the above-identified patent and that said Letters Patent is hereby corrected as shown below:

In the Specification

In Column 1, In Line 14 (Approx.), Delete "afore-mentioned" and insert -- aforementioned --.

Signed and Sealed this
Tenth Day of December, 2024

Katherine Kelly Vidal
*Director of the United States Patent and Trademark Office*